Figure 1:
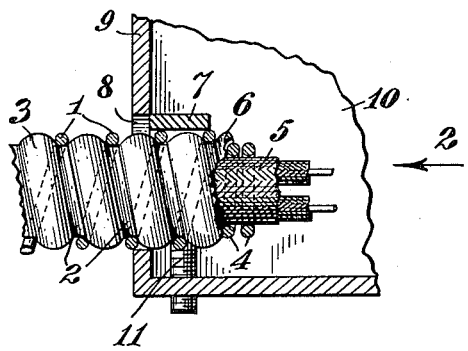

Mar. 13, 1923. 1,448,367.
G. C. THOMAS, Jr.
FITTING FOR ELECTRICAL CONDUITS, CABLES, AND THE LIKE.
FILED MAY 11, 1922.

INVENTOR
George C. Thomas, Jr.
BY
J. T. Edmonds
ATTORNEY

Patented Mar. 13, 1923.

1,448,367

UNITED STATES PATENT OFFICE

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY.

FITTING FOR ELECTRICAL CONDUITS, CABLES, AND THE LIKE.

Application filed May 11, 1922. Serial No. 559,993.

*To all whom it may concern:*

Be it known that I, GEORGE C. THOMAS, Jr., a citizen of the United States, residing at Elizabeth, in the county of Union and State of New Jersey, have invented certain new and useful Improvements in Fittings for Electrical Conduits, Cables, and the like, of which the following is a specification.

This invention relates to fittings for electrical conduits, cables and the like, and more particularly to fittings which serve to connect electrical conduits or cables to conduit openings in outlet boxes or the like, and also to fittings which serve to protect a cable or wire from being damaged where it passes by the broken edge of its conduit or armor.

One of the aims of my invention is to provide a cheap and efficient fitting which serves as a terminal bushing whereby a cable or wire emerging from an electrical conduit or armor passed through the fitting is positively protected from damage by the end of said conduit. A further object of my invention is to provide a fitting which serves both as a terminal bushing and as a connector. Another object is to provide a fitting of the above character which may be readily and easily placed in position, and one which automatically adjusts itself to the variations in the size of the armor or cable, and firmly and positively maintains itself in position thereon. A further object of my invention is to provide a fitting which, when associated with an ordinary grooved armor, strengthens the weak places of the armor. Other objects will be in part obvious and in part pointed out hereinafter.

In accordance with my invention I provide a helix of resilient wire having a helical portion which is shaped to grip and hold firmly an electrical conduit or cable passed therethrough, and another helical portion which is adapted to encircle a cable or wire underneath the rough or sharp edges of its conduit or armor to keep the cable or wire from becoming cut or abraded by contact with these edges. If desired, a small eccentrically disposed loop may be formed at the end of the wire which forms the fitting, so that the fitting and conduit or cable passed therethrough may be secured to a wall adjacent an outlet opening of an outlet box, or the like, by means of a screw extending through this loop and engaging the wall. The main gripping portion of the fitting is preferably shaped to follow and to seat in the helical groove of the ordinary flexible type of armor, so as to strengthen the weak places in the armor while securely attaching itself thereto. By this arrangement an attempt to turn the armor in clockwise direction causes the armor to be more firmly seated in the fitting, and turning of the armor in the opposite direction is prevented by the gripping action of the resilient helix.

Figure 2:
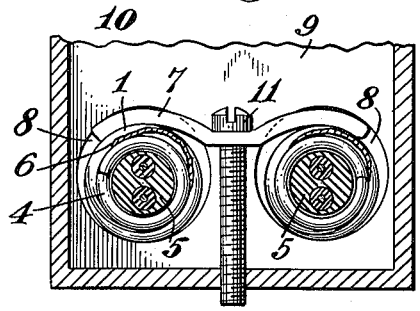
Figure 3:
Figure 4:
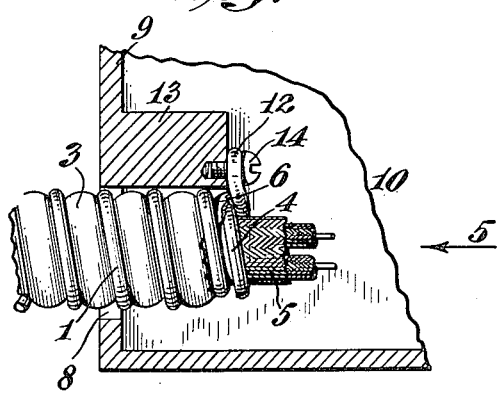
Figure 5:
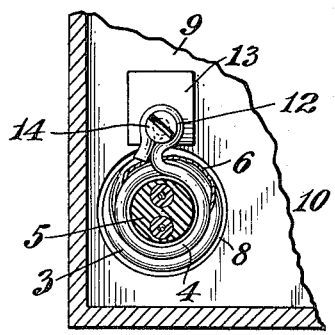

In order that a clearer understanding of my invention may be had, attention is hereby directed to the accompanying drawings forming a part of this application and illustrating certain possible embodiments of my invention. Referring to the drawings, Fig. 1 is a side elevation of a piece of armored cable secured in position in a knockout box by means of a clamp, the fitting, serving as a terminal bushing, being shown in longitudinal section; Fig. 2 is an end view of Fig. 1 as viewed from the right; Fig. 3 is a detail side elevation of the fitting; Fig. 4 is a view similar to Fig. 1, but showing a modified form of fitting which serves both as a terminal bushing and as a connector; Fig. 5 is an end view of Fig. 4; and Fig. 6 is a detail side elevation of this modified form of fitting.

Referring to the drawings, in both modifications my fitting comprises a suitably resilient wire fashioned into a gripping helix portion 1, the diameters of the coils and their inclination being such that the wire will grip and hold firmly an electrical conduit or cable passed therethrough. If desired, the helix 1 is arranged to follow and to seat within the grooves 2 of the standard flexible armor 3 for electrical cables and wires, to grip and hold the armor and to strengthen its weak places. At one end of the gripping portion 1 there are one or more turns of wire forming another helix portion 4 which is adapted to encircle the wire or cable 5 where it leaves its conduit 3 and forms a terminal bushing therefor. The fitting is placed in position by screwing helix 1 over the armor 3, or by screwing the armor 3 into helix 1, until the portion 4 of the fitting becomes seated underneath the end 6 of the armor 3, and holds the cable 5 out of contact therewith, thus positively protecting the cable 5 from being cut or abraded by the rough or sharp edges which are usually present at the end 6 of the conduit. The conduit, with my fitting in place thereon, may be secured to an outlet box in any one of a number of well known ways. For instance, the outlet box 10 may be provided internally with a clamp 7 which is adapted to be pressed downwardly against the top of the armor 3 where it passes through the hole 8 in the wall 9 of the box 10, as by means of a screw or bolt 11. Clamp 7 clamps the fitting against turning, and consequently armor 3 cannot be turned in one direction because the portion 4 stops its inward movement relative to the fitting, and the armor 3 cannot be turned in the other direction because this tightens the resilient helix 1 upon the armor and prevents such movement. In this way my fitting aids in firmly and securely holding the conduit in place in the box 10.

Figure 6:
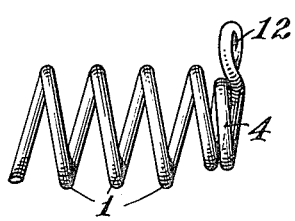

As shown in Figs. 4, 5 and 6, at the end of the terminal bushing portion 4 of the fitting, the end of the wire may be formed into a small eccentrically disposed loop 12 which is arranged to abut against the wall 9, or against a boss 13 thereon, so that the conduit and cable may be secured in place by means of a screw 14 extending through loop 12 and engaging the wall 9 or the boss 13. With this arrangement the clamping means 7 are not required, yet the fitting serves as well as before in affording terminal protection, strengthening the weak places of the armor 3, and in holding the parts against removal or displacement.

From the above it will be readily apparent that a fitting of the above character may be constructed very cheaply, and much more cheaply than fittings heretofore known and useful for the same purposes. Cheapness is one of the most important factors in the commercial field of this art, and the advantage of cheapness cannot be too strongly emphasized. In addition, on account of its resiliency this fitting grips the armor more firmly, and positively protects and strengthens the weak places of the armor. It fits the conduit or cable snugly, and, when used as a terminal bushing, positively protects the cable from the rough edges of the conduit or armor. Both parts of the fitting being resilient, it accommodates itself to variations in the size of the conduit and cable. When used as a connector, it holds the conduit and cable firmly and securely in place.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. In an electrical fitting of the character described, a helix of resilient wire including a portion shaped to grip an electrical conduit passed therethrough and another portion shaped to fit about a cable leading from said conduit and to fit underneath the edge of said conduit to hold said cable out of contact with said edge.

2. In an electrical fitting of the character described, in combination, resilient means, comprising a helix of wire, for gripping an electrical armored cable passed through said helix, and means, comprising a turn of wire at the end of said helix and shaped to fit underneath the edge of said armor and about a cable leading therefrom, for holding said cable out of contact with said edge.

3. In an electrical fitting of the character described, in combination, means for gripping and strengthening grooved armor for electrical cables, said means including a helix of resilient wire shaped to seat snugly within the groove of said arbor when passed through said helix, and means, comprising a helix of wire at the end of said first helix and shaped to fit underneath the edge of said armor and about a cable leading therefrom, for holding said cable out of contact with said edge.

4. In an electrical fitting of the character described, a helix of resilient wire including a major portion shaped to grip an electrical conduit passed therethrough, a smaller portion shaped to fit about a cable leading from said conduit and to fit underneath the edge of said conduit to hold said cable out of contact therewith, and means, including a loop formed by said wire for securing said ftting and conduit to a wall about a conduit opening.

This specification signed and witnessed this 9th day of May, 1922.

GEORGE C. THOMAS, Jr.